Patented Jan. 14, 1930

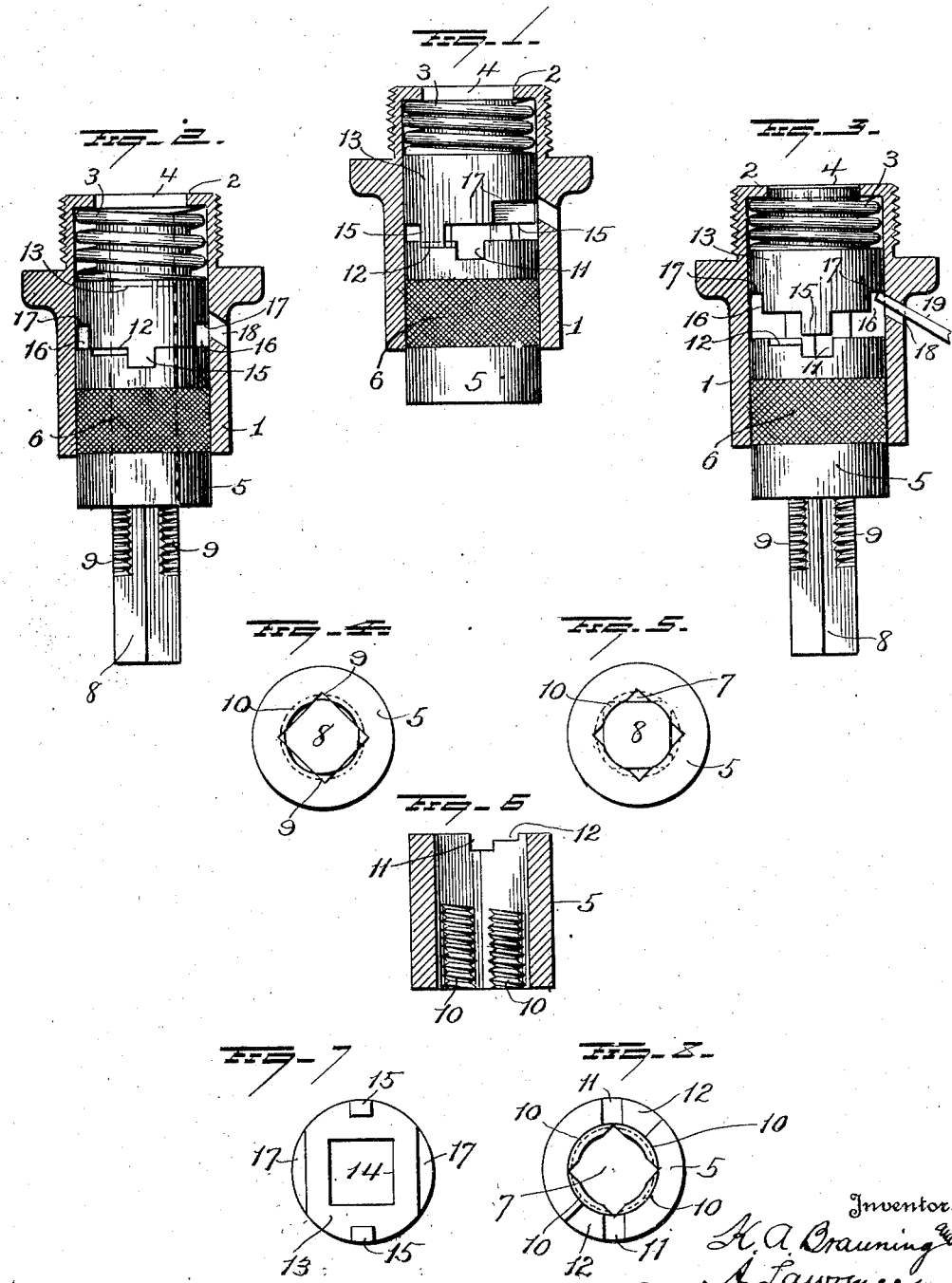

1,743,955

UNITED STATES PATENT OFFICE

KARL A. BRAUNING AND ALFRED LAWRENCE, OF STAMFORD, CONNECTICUT, ASSIGNORS TO THE YALE & TOWNE MANUFACTURING COMPANY, OF STAMFORD, CONNECTICUT

KNOB FASTENER

Application filed February 19, 1927. Serial No. 169,509.

This invention relates to knob fasteners and particuarly to improvements upon such structures as disclosed in patents to A. A. Page No. 840,653, Jan. 8, 1907, and T. E. Crouch No. 1,084,316 Jan. 13, 1914.

The object of the present invention is the provision of a simple construction whereby a knob may be easily and effectually secured to a spindle without a fastening screw and without the use of tools, and so that the knob may be assembled complete in itself whereby it can be slipped on the spindle and fastened with but a slight twist. The invention is illustrated in the accompanying drawing and will be hereinafter first fully described and then particularly defined in the appended claims.

In the drawing, Figure 1 is a sectional elevation of the knob shank and the parts carried thereby removed from the spindle, Figure 2 is a similar view showing the shank locked to the spindle, Figure 3 is a similar view showing the method of releasing the shank from the spindle, Figures 4 and 5 are views of the spindle and the lower end of the fixed clutch sleeve, the parts being arranged in Figure 4 to permit withdrawal of the shank and in Figure 5 to prevent withdrawal, Figure 6 is a longitudinal section of the fixed sleeve, Figure 7 is a bottom plan view of the movable sleeve, Figure 8 is a top plan view of the fixed sleeve.

The cylindrical knob shank 1 is externally threaded at its outer end to receive a standard knob and is also provided at its outer end with an internal annular flange 2 forming an abutment for an expansion spring 3, a central opening 4 being defined by the flange, as shown. An inner clutch sleeve 5 is secured in the inner end of the shank so as to be held against rotation, and any preferred means for securing the sleeve may be employed, the means shown being a knurled surface 6 on the sleeve which will have binding engagement with the inner surface of the shank. This clutch sleeve has a bore 7 to receive the spindle 8, the spindle being a rectangle in cross section with threads 9, or the equivalent thereof, on its corners, while the bore of the sleeve is substantially rectangular and provided with threads 10 on its sides to be engaged by the threads 9 on the spindle. In the outer end edge of the sleeve (which is the upper end as the device appears in the drawing) we provide one or more notches 11 and a shallow recess 12 leading from one side of the notch. Mounted slidably in the outer end of the shank is a clutch sleeve 13 which is held yieldably to the fixed slutch sleeve 5 by the spring 3 in an obvious manner. This movable sleeve has a rectangular bore 14 to receive the spindle so that while the spindle may slide in the sleeve there can be no relative rotation. Upon the inner end of the sleeve 13 are lugs 15 arranged to engage the notches 11 to lock the sleeves together and to the spindle and prevent relative rotation between any of the parts. The sleeve 13 is also provided with recesses 16 producing overhanging shoulders 17, and an opening 18 is formed through the shank to permit a pry, at 19, to be inserted into engagement with the adjacent shoulder 17.

Assuming the clutch sleeves and the shank to have been assembled and in the positions shown in Figure 1, the bores of the two sleeves will be in alinement with their corresponding faces in the same longitudinal planes of the shank, the sleeve 13 being held to the sleeve 6 by the spring 3 and the lugs 15 resting in the recesses 12. The shank now may be slid over the spindle if it be held in such position that the threads 9 and 10 do not engage. After the spindle has been thus engaged in the bores of both sleeves and relative rotation of the spindle and the outer sleeve is prevented by the angular formation of the spindle and the bore of the sleeve, the shank is rotated until the lugs 15 mate with the notches 11 whereupon the spring will expand and drive the lugs into the notches at which time the threads 9 will have been brought into engagement with the threads 10 and relative sliding movement of the shank and the spindle will be prevented. The spindle cannot rotate in the sleeve 13 and said sleeve cannot rotate in the shank because of the engagement of the lugs 15 in the notches 11. Consequently, the shank will be secured to the spindle to rotate the latter. To remove the knob, a thin blade or the like 19 is inserted through the opening 18 in the shank and the movable sleeve is pried outwardly against the tension of the spring 3 to withdraw the lugs 15 from the notches 11 whereupon the shank may be rotated to bring the parts into the relation described in connection with Fig. 1, permitting the shank to slide from the spindle. Actually, the retraction of the movable sleeve is slight and the lug 15 quickly abuts the end of the recess 12, but this slight movement is sufficient to bring the bores of the two sleeves into the desired relation.

Having fully described our invention what we claim as new and desire to secure by Letters-Patent, is:—

1. In a knob assembly, a knob and shank, said shank having an internal bore, two cooperative clutch elements mounted within the bore of said shank, one of said clutch elements being fixed to the shank and adapted to prevent longitudinal movement on the spindle while at a certain angular relation thereto, the other of said clutch elements being spring pressed to lock the first mentioned element in said certain angular relation to the spindle.

2. In a knob assembly, the combination of an angular spindle having threaded corners, a knob shank having a spring pressed clutch sleeve freely mounted therein and adapted for sliding movement on the spindle, a second clutch element fixed within the shank and having a threaded bore for cooperation with the spindle threads when at a certain angular position relative thereto, the first mentioned clutch being adapted to lock said second mentioned clutch in said certain position.

3. In a knob assembly, the combination of a spindle having mutilated threads, a knob shank having a clutch sleeve freely mounted therein and adapted for sliding movement on the spindle, a second clutch sleeve fixed within the shank and having a mutilated threaded bore for cooperation with the spindle threads when at a certain angular position relatively thereto, a spring within the shank for forcing the first mentioned sleeve axially against the second sleeve, the first mentioned clutch sleeve being adapted to lock said second clutch sleeve in said certain position.

In testimony whereof, we have signed this specification.

KARL A. BRAUNING.
ALFRED LAWRENCE.